(12) United States Patent
Miyazaki et al.

(10) Patent No.: US 11,380,137 B2
(45) Date of Patent: *Jul. 5, 2022

(54) MOTION ANALYSIS DEVICE, MOTION ANALYSIS METHOD AND RECORDING MEDIUM

(71) Applicant: OMRON Corporation, Kyoto (JP)

(72) Inventors: Masashi Miyazaki, Nara (JP); Hirotaka Wada, Kyoto (JP)

(73) Assignee: OMRON Corporation, Kyoto (JP)

( * ) Notice: Subject to any disclaimer, the term of this patent is extended or adjusted under 35 U.S.C. 154(b) by 93 days.

This patent is subject to a terminal disclaimer.

(21) Appl. No.: 17/070,889

(22) Filed: Oct. 14, 2020

(65) Prior Publication Data

US 2021/0142050 A1 May 13, 2021

(30) Foreign Application Priority Data

Nov. 7, 2019 (JP) .............................. JP2019-202602

(51) Int. Cl.
*G06V 40/00* (2022.01)
*G06V 40/20* (2022.01)
*G06F 3/14* (2006.01)

(52) U.S. Cl.
CPC ................ *G06V 40/28* (2022.01); *G06F 3/14* (2013.01)

(58) Field of Classification Search
None
See application file for complete search history.

(56) References Cited

U.S. PATENT DOCUMENTS

| 8,094,156 B2 * | 1/2012 | Smith ..................... G06T 13/40 345/949 |
| 8,952,969 B2 * | 2/2015 | Isner ....................... G06T 13/40 345/474 |
| 2001/0004262 A1 * | 6/2001 | Mochizuki .............. G06T 13/40 345/474 |
| 2005/0010864 A1 * | 1/2005 | Horikiri ................. G06Q 10/10 715/201 |
| 2009/0295942 A1 * | 12/2009 | Barnett .............. H04N 1/00387 348/231.2 |
| 2017/0010187 A1 * | 1/2017 | Morita ................. G01M 99/008 |

FOREIGN PATENT DOCUMENTS

JP  2016087420  5/2016

* cited by examiner

*Primary Examiner* — Martin Mushambo
(74) *Attorney, Agent, or Firm* — JCIPRNET

(57) ABSTRACT

A motion analysis device, a motion analysis method and a recording medium for storing a motion analysis program that make it possible to use a display region more efficiently are provided. The motion analysis device includes an acquisition part that acquires time-series data relating to an operation performed by an operator, an analysis part that analyzes the time-series data and generates motion data indicating a type and execution time of an elemental motion, a generation part that excludes data corresponding to a stop period of the operator which is taken until an initial elemental motion is started from the motion data, and generates shortened motion data, and a display control part that performs control to differentiate periods corresponding to different elemental motions and display the shortened motion data on a display.

12 Claims, 9 Drawing Sheets

D1 motion data of left hand

| start time | end time | elemental motion |
|---|---|---|
| t0 | t3 | stop |
| t3 | t4 | grasping |
| t4 | t5 | transportation |
| t5 | t6 | adjustment |
| t6 | t9 | NA |
| t9 | t10 | adjustment |

D2 motion data of right hand

| start time | end time | elemental motion |
|---|---|---|
| t0 | t1 | stop |
| t1 | t2 | grasping |
| t2 | t3 | transportation |
| t3 | t5 | NA |
| t5 | t6 | adjustment |
| t6 | t7 | NA |
| t7 | t8 | grasping |
| t8 | t9 | transportation |
| t9 | t10 | adjustment |
| t10 | t11 | storage |

MOTION ANALYSIS DEVICE, MOTION ANALYSIS METHOD AND RECORDING MEDIUM

CROSS REFERENCE TO RELATED APPLICATIONS

This application claims the priority benefit of Japanese Patent Application No. 2019-202602, filed on Nov. 7, 2019. The entirety of the above-mentioned patent application is hereby incorporated by reference herein and made a part of this specification.

BACKGROUND

Technical Field

The disclosure relates to a motion analysis device, a motion analysis method and a motion analysis program.

Description of Related Art

In the past, motion sensors that measure motion data of operators and techniques of analyzing moving images obtained by photographing situations in which operators move and generating motion data have been used. The motion data may be used for evaluating whether operators are performing proper motions.

For example, Patent Document 1 (Japanese Patent Application Laid-Open No. 2016-87420) discloses a coordinated movement evaluation device that displays repetitive movement for any part of a human body, detects movement performed by a subject in imitation of the repetitive movement, compares evaluation target data based on the movement performed by the subject with reference data used for evaluating the movement performed by the subject, and evaluates the movement performed by the subject.

In Patent Document 1, for example, as shown in FIG. 6, a graph of evaluation target data based on movement performed by a subject is displayed by representing time on the horizontal axis and representing the amount of detection on the vertical axis. However, data corresponding to a period in which an operator does not perform a motion may be included in the motion data, and when such display is performed, useless data corresponding to a stop period is also displayed, which results in applying compression to a display region.

The disclosure provides a motion analysis device, a motion analysis method and a motion analysis program that make it possible to use a display region more efficiently.

SUMMARY

According to one embodiment of the present disclosure, a motion analysis device is provided and includes: an acquisition part that acquires time-series data relating to an operation performed by an operator; an analysis part that analyzes the time-series data and generates motion data indicating a type and execution time of an elemental motion; a generation part that excludes data corresponding to a stop period of the operator which is taken until an initial elemental motion is started from the motion data, and generates shortened motion data; and a display control part that performs control to differentiate periods corresponding to different elemental motions and display the shortened motion data on a display part.

According to another embodiment of the present disclosure, a motion analysis method is provided and includes: acquiring time-series data relating to an operation performed by an operator; analyzing the time-series data and generating motion data indicating a type and execution time of an elemental motion; excluding data corresponding to a stop period of the operator which is taken until an initial elemental motion is started from the motion data, and generating shortened motion data; and performing control to differentiate periods corresponding to different elemental motions and display the shortened motion data on a display part.

According to another embodiment of the present disclosure, a non-transitory computer-readable recording medium that stores a motion analysis program causing a calculation part included in a motion analysis device to function as: an acquisition part that acquires time-series data relating to an operation performed by an operator; an analysis part that analyzes the time-series data and generates motion data indicating a type and execution time of an elemental motion; a generation part that excludes data corresponding to a stop period of the operator which is taken until an initial elemental motion is started from the motion data, and generates shortened motion data; and a display control part that performs control to differentiate periods corresponding to different elemental motions and display the shortened motion data on a display part.

DESCRIPTION OF THE EMBODIMENTS

Figure 1:
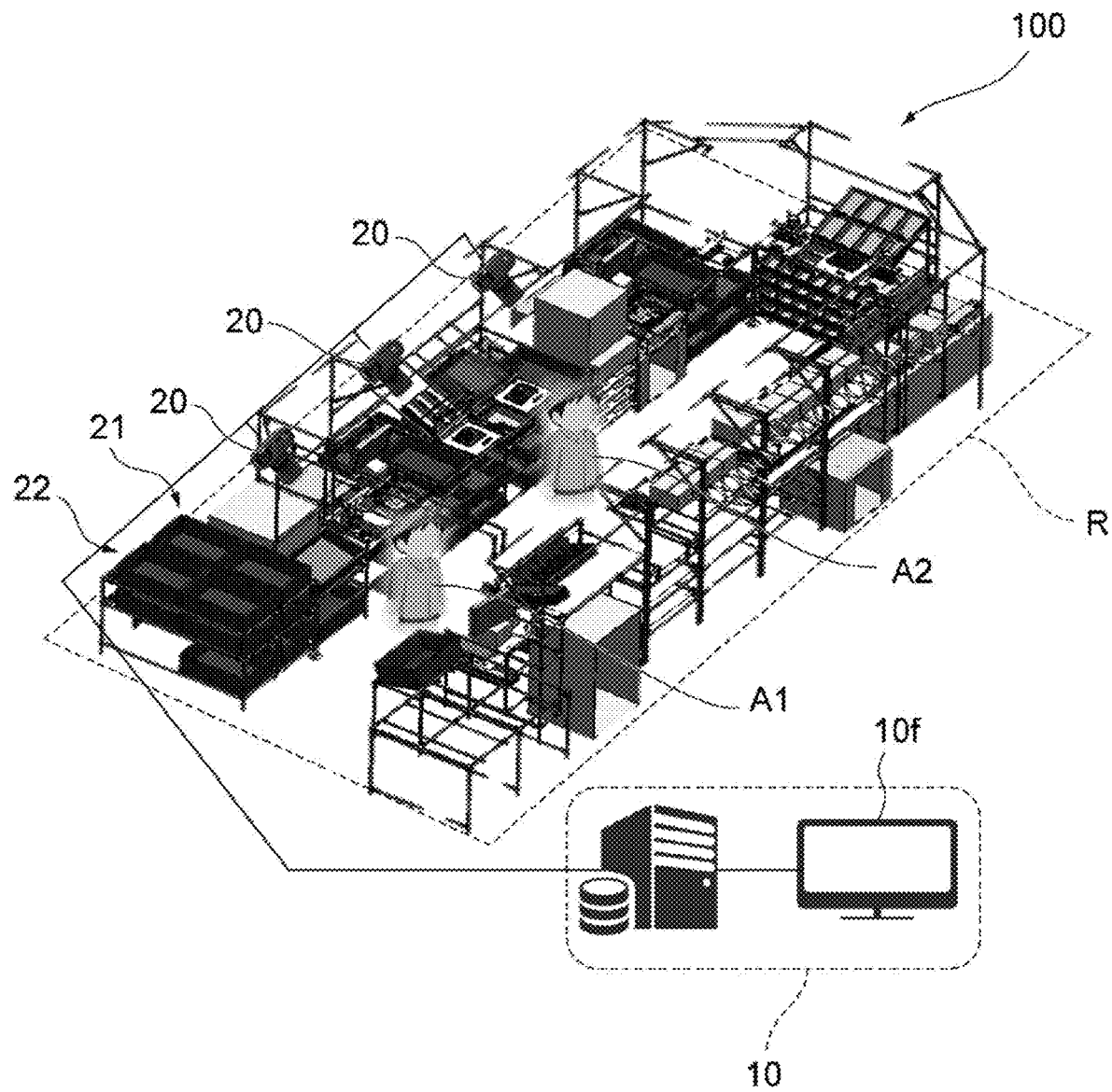
FIG. 1 is a diagram illustrating an outline of a motion analysis system according to an embodiment of the disclosure.

An embodiment of the disclosure will be described with reference to the accompanying drawings. Meanwhile, in each drawing, those denoted by the same reference numerals and signs have the same or similar components.

1. Application Example

First, an example of a situation to which the disclosure is applied will be described with reference to FIG. 1. FIG. 1 is a diagram illustrating an outline of a motion analysis system 100 according to an embodiment of the disclosure. The motion analysis system 100 according to the present embodiment includes a camera 20 that captures a moving image relating to an operator's motion which is executed in a work area R, a photoelectric sensor 21 that detects that the operator's hand enters and leaves a predetermined region, and a pressure sensor 22 that measures pressure applied to a predetermined region. Here, a moving image captured by the camera 20, a signal measured by the photoelectric sensor 21, and a signal measured by the pressure sensor 22 are examples of time-series data of the disclosure. The work area R of this example is a region including the whole manufacturing line, but the work area R may be any region, and may be, for example, a region in which a predetermined process is performed or a region in which a predetermined elemental motion is performed. The elemental motion referred to here is a motion of one unit which is executed by an operator, and includes a motion such as, for example, grasping of parts, transportation of parts, assembly and adjustment of parts, or storage of an assembled product.

In this example, a case where a first operator A1 and a second operator A2 perform operations determined in advance in the work area R will be described. Hereinafter, the first operator A1 and the second operator A2 are referred to as an operator A collectively.

The motion analysis system 100 includes a motion analysis device 10. The motion analysis device 10 acquires time-series data relating to motions of a plurality of parts of the operator A such as a moving image, analyzes the time-series data, and generates motion data indicating the type of elemental motion and the execution time of the elemental motion from the start to the end thereof. In addition, the motion analysis device 10 excludes data corresponding to a stop period of the operator A which is taken until an initial elemental motion is started from the motion data, and generates shortened motion data. The motion analysis device 10 performs control to differentiate periods corresponding to different elemental motions and display the shortened motion data on a display part 10f.

The display part 10f differentiates periods corresponding to different elemental motions and displays the shortened motion data. In addition, the display part 10f may display reference motion data indicating a plurality of elemental motions serving as a reference. Further, the display part 10f may reproduce a moving image relating to the motion of the operator A for each of a plurality of elemental motions.

According to the motion analysis device 10 of the present embodiment, it is possible to use a display region more efficiently by causing the display part 10f to display the shortened motion data excluding data corresponding to a stop period of the operator from the motion data.

2. Configuration Example

[Functional Configuration]

Figure 2:
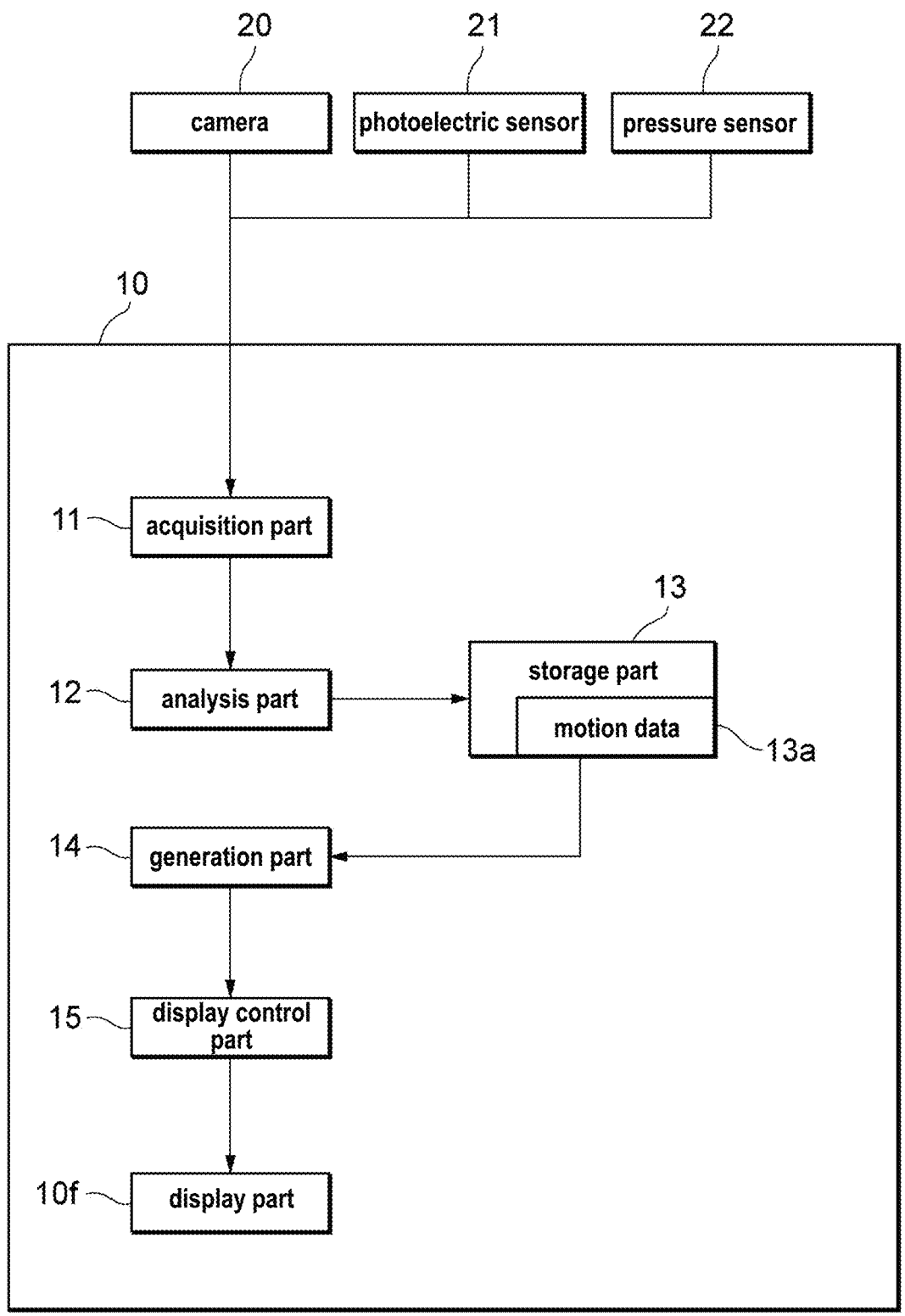
FIG. 2 is a diagram illustrating a functional block of the motion analysis device according to the present embodiment.

FIG. 2 is a diagram illustrating a functional block of the motion analysis device 10 according to the present embodiment. The motion analysis device 10 includes an acquisition part 11, an analysis part 12, a storage part 13, a generation part 14, and a display control part 15.

<Acquisition Part>

The acquisition part 11 acquires time-series data relating to motions of a plurality of parts of the operator A with respect to an operation performed by the operator A. The time-series data includes a moving image captured by the camera 20, a signal measured by the photoelectric sensor 21, and a signal measured by the pressure sensor 22.

<Analysis Part>

The analysis part 12 analyzes the time-series data and generates motion data indicating the type of elemental motion and the execution time of the elemental motion from the start to the end thereof. The type of elemental motion is, for example, grasping, transportation, adjustment and storage of parts, but may include other types of motions. In addition, the elemental motion may be arbitrarily set. The start and end of the elemental motion may be represented by a time, or may be represented by an elapsed time from a starting point in time of time-series data.

<Storage Part>

The storage part 13 stores motion data 13a generated by the analysis part 12. The storage part 13 may store time-series data.

<Generation Part>

The generation part 14 excludes data corresponding to a stop period of the operator A which is taken until an initial elemental motion is started from the motion data, and generates shortened motion data.

<Display Control Part>

The display control part 15 performs control to differentiate periods corresponding to different elemental motions and display the shortened motion data on the display part 10f. Differentiating periods corresponding to different elemental motions includes displaying periods corresponding to different elemental motions in different display modes.

The display control part 15 performs control to differentiate periods corresponding to different elemental motions and display the shortened motion data and reference motion data indicating a plurality of elemental motions serving as a reference side by side on the display part 10f. Here, the reference motion data indicating a plurality of elemental motions serving as a reference is motion data serving as a sample in a case where the operator A performs an operation, and is data indicating the execution order and execution time of a plurality of elemental motions. Meanwhile, in a case where a unit motion having a plurality of elemental motions constituted as one unit is repeatedly executed, the display control part 15 may repeatedly display the motion data and the reference motion data side by side on the display part 10f. In that case, the reference motion data may be displayed in accordance with the start timing of the repetitive motion. Displaying the reference motion data side by side with the motion data in this manner makes it possible for the operator A to easily ascertain a motion to be executed.

The acquisition part 11 may acquire multiple types of time-series data relating to an operation performed by the operator A. The multiple types of time-series data referred to here may be time-series data relating to motions of a plurality of parts of the operator A, or may be, for example, time-series data relating to motions of both hands of the operator A. In this case, the analysis part 12 analyzes each of the multiple types of time-series data and generates multiple types of motion data indicating the type and execution time of elemental motions, and the generation part 14 excludes data corresponding to a stop period of the operator which is taken until an initial elemental motion is started from the multiple types of motion data and generates a plurality of shortened motion data. The display control part 15 performs control to differentiate periods corresponding to different elemental motions and display the plurality of shortened motion data side by side on the display part 10f. In this manner, the data corresponding to a stop period of the operator which is taken until an initial elemental motion is started is excluded from the multiple types of motion data, and the plurality of shortened motion data is displayed side by side, so that it is possible to use a display region more efficiently even in a case where there are many types of time-series data.

In addition, the generation part 14 may exclude data corresponding to a stop period of the operator A which is taken until the unit motion having a plurality of elemental motions constituted as one unit is ended and then the next unit motion is started among the shortened motion data, and generate additionally shortened motion data. In this case, the display control part 15 performs control to differentiate periods corresponding to different elemental motions and display the additionally shortened motion data on the display part 10f. In this manner, in a case where the unit motion is repeatedly executed, display of data corresponding to a stop period between the unit motions is omitted, and thus it is possible to use a display region more efficiently. Meanwhile, a user may be able to select whether or not to exclude data corresponding to a period which is taken until the unit motion is ended and then the next unit motion is performed.

The acquisition part 11 may acquire multiple types of time-series data relating to an operation performed by the operator A, and the analysis part 12 may analyze each of the multiple types of time-series data and generate multiple types of motion data indicating the type and execution time of elemental motions. In that case, the generation part 14 excludes data corresponding to a stop period of the operator A which is taken until an initial elemental motion is started from the multiple types of motion data, generates a plurality of shortened motion data, excludes data corresponding to an overlapping period over the plurality of shortened motion data in the stop period of the operator A which is taken until a unit motion having a plurality of elemental motions constituted as one unit among the plurality of shortened motion data is ended and then the next unit motion is started, and generates a plurality of additionally shortened motion data. The display control part 15 performs control to differentiate periods corresponding to different elemental motions and display the plurality of additionally shortened motion data side by side on the display part 10f. In this manner, in a case where the unit motion is repeatedly executed, display of data corresponding to an overlapping period over a plurality of shortened motion data in a stop period between the unit motions is omitted, and thus it is possible to use a display region more efficiently. Meanwhile, a user may be able to select whether or not to exclude data corresponding to a period which is taken until the unit motion is ended and then the next unit motion is performed.

[Hardware Configuration]

Figure 3:
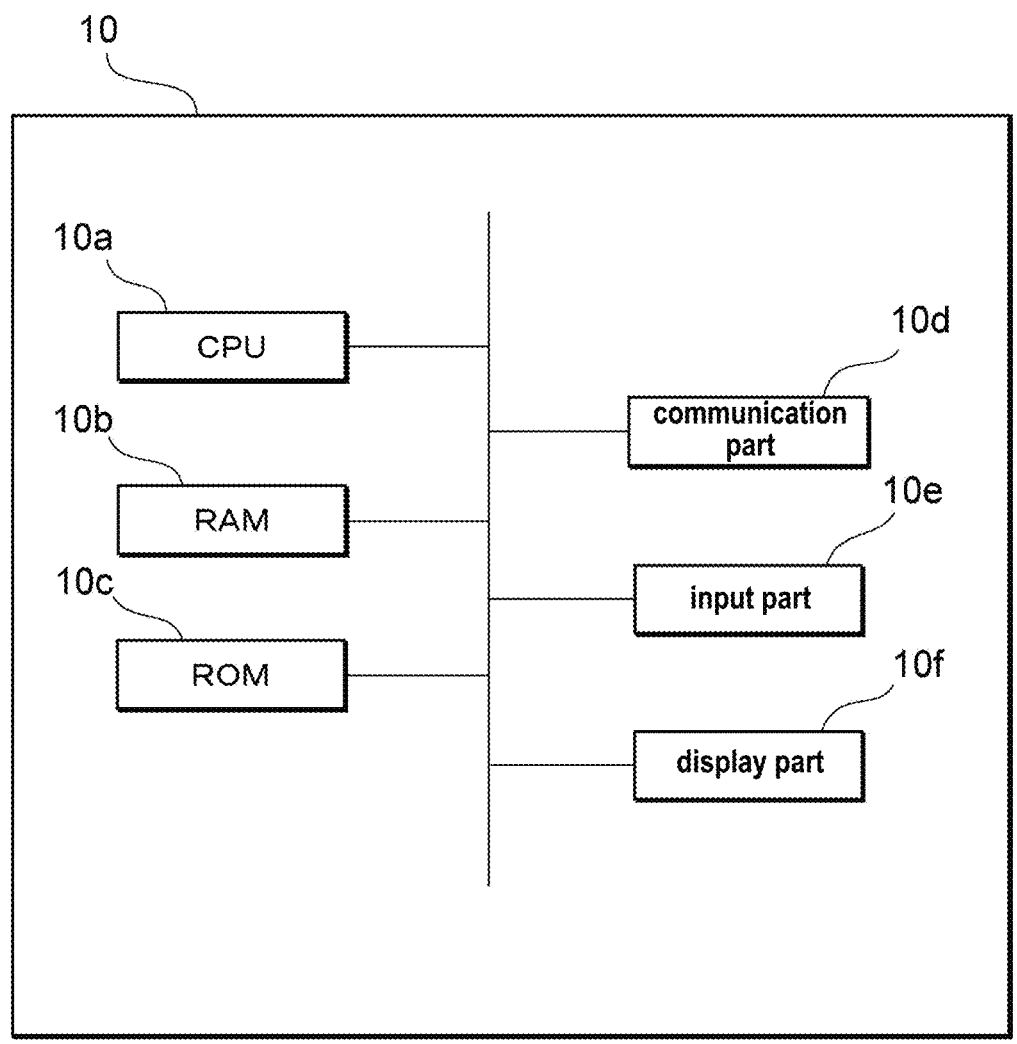
FIG. 3 is a diagram illustrating a physical configuration of the motion analysis device according to the present embodiment.

FIG. 3 is a diagram illustrating a physical configuration of the motion analysis device 10 according to the present embodiment. The motion analysis device 10 includes a central processing unit (CPU) 10a equivalent to a calculation part, a random access memory (RAM) 10b equivalent to the storage part, a read only memory (ROM) 10c equivalent to the storage part, a communication part 10d, an input part 10e, and the display part 10f. These components are connected to each other so as to mutually transmit and receive data through a bus. Meanwhile, in this example, a case where the motion analysis device 10 is constituted by one computer will be described, but the motion analysis device 10 may be realized by a combination of a plurality of computers. In addition, the components shown in FIG. 3 are an example, and the motion analysis device 10 may have components other than these, or may not have some of these components.

The CPU 10a is a control part that performs control relating to the execution of a program stored in the RAM 10b or the ROM 10c or the calculation or processing of data. The CPU 10a is a calculation part that generates motion data by analyzing time-series data relating to an operation performed by the operator, and executes a program (motion analysis program) for performing control to display the shortened motion data on the display part. The CPU 10a receives various types of data from the input part 10e or the communication part 10d, and displays results of calculation of data on the display part 10f or stores the results in the RAM 10b.

The RAM 10b is an element that can rewrite data among the storage parts, and may be constituted by, for example, a semiconductor memory element. The RAM 10b may store a program executed by the CPU 10a or data such as motion data. Meanwhile, these are an example, and the RAM 10b may store data other than these, or may not store some of these.

The ROM 10c is an element that can read out data among the storage parts, and may be constituted by, for example, a semiconductor memory element. The ROM 10c may store, for example, a motion analysis program or data which is not rewritten.

The communication part 10d is an interface for connecting the motion analysis device 10 to other instruments. The communication part 10d may be connected to a communication network such as the Internet.

The input part 10e accepts an input of data from a user, and may include, for example, a keyboard and a touch panel.

The display part 10f visually displays the result of calculation performed by the CPU 10a, and may be constituted by, for example, a liquid crystal display (LCD). The display part 10f may display the shortened motion data.

The motion analysis program may be provided by being stored in a computer readable storage medium such as the RAM 10b or the ROM 10c, or may be provided through a communication network which is connected by the communication part 10d. In the motion analysis device 10, various motions described with reference to FIG. 2 are realized by the CPU 10a executing the motion analysis program. Meanwhile, these physical configurations are an example, and may not necessarily be independent of each other. For example, the motion analysis device 10 may include a large-scale integration (LSI) in which the CPU 10a and the RAM 10b or the ROM 10c are integrated with each other.

3. Operation Example

Figure 4:
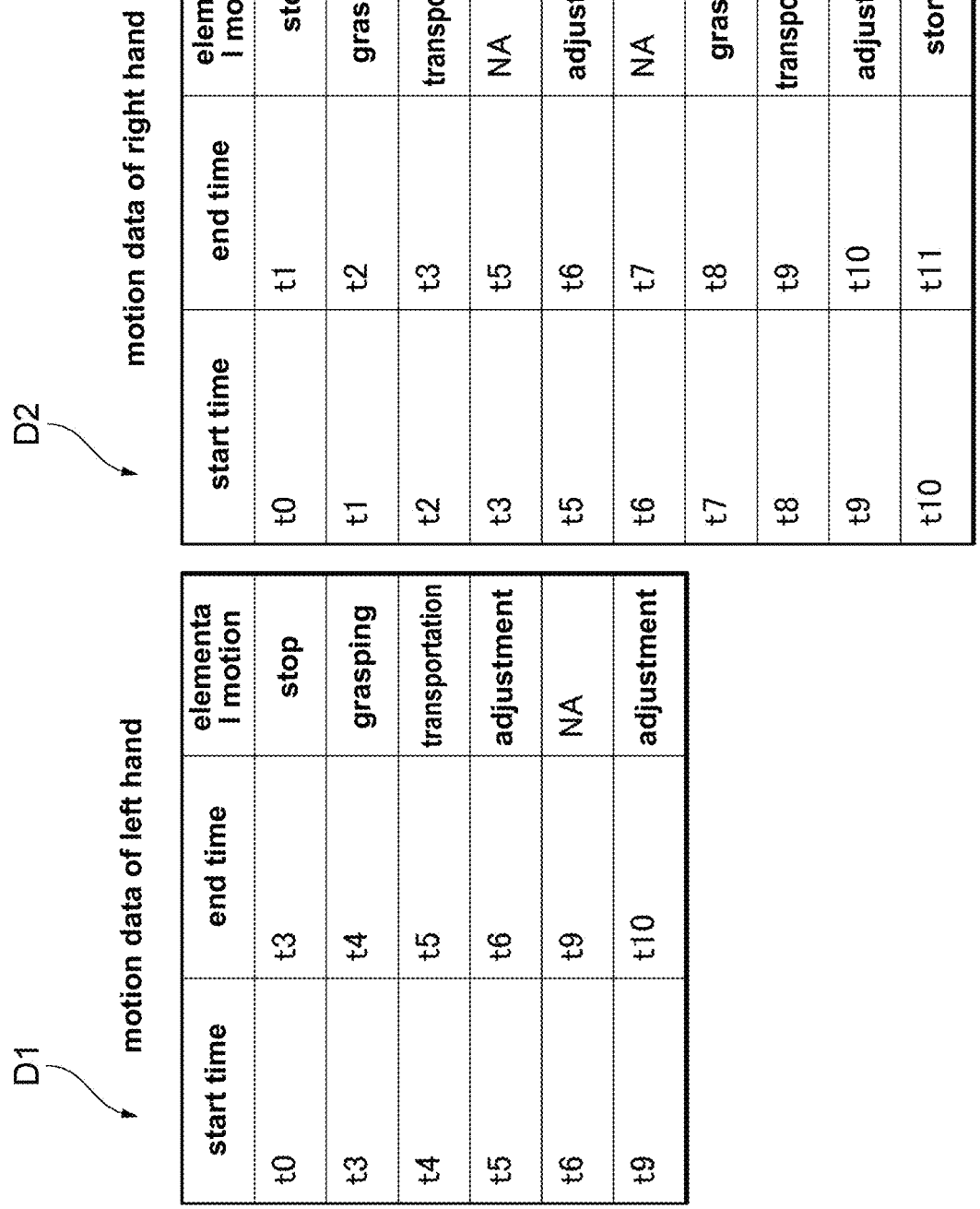
FIG. 4 is a diagram illustrating motion data generated by the motion analysis device according to the present embodiment.

FIG. 4 is a diagram illustrating motion data generated by the motion analysis device 10 according to the present embodiment. The drawing shows each example of motion data D1 of a left hand and motion data D2 of a right hand. Letters of t0 to t11 described in the drawing indicate times arranged in a time-series order.

The motion data D1 of the left hand and the motion data D2 of the right hand include a column of "elemental motions" indicating the types of elemental motions, a column of "start times" indicating the start times of elemental motions, and a column of "end times" indicating the end times of elemental motions.

For example, in the motion data D1 of the left hand, an "elemental motion" having a start time of "t0" and an end time of "t3" is "stop." In addition, in the motion data D1 of the left hand, an "elemental motion" having a start time of "t3" and an end time of "t4" is "grasping." In addition, in the motion data D2 of the right hand, an "elemental motion" having a start time of "t0" and an end time of "t1" is "stop." Further, in the motion data D2 of the right hand, an "elemental motion" having a start time of "t1" and an end time of "t2" is "grasping." In this case, it is indicated that the left hand and the right hand have stopped from time t0 to time t1, a motion of grasping is then started with the right hand, a motion of grasping is subsequently started with the left hand, grasping with the right hand is ended, and grasping with the left hand is ended.

In addition, in the motion data D2 of the right hand, it is indicated that an "elemental motion" having a start time of "t3" and an end time of "t5" is "NA" and that a motion relating to an operation is not performed. Meanwhile, an "elemental motion" of "NA" involves the operator A having stopped or a motion irrelevant to a predetermined elemental motion being performed.

Figure 5:
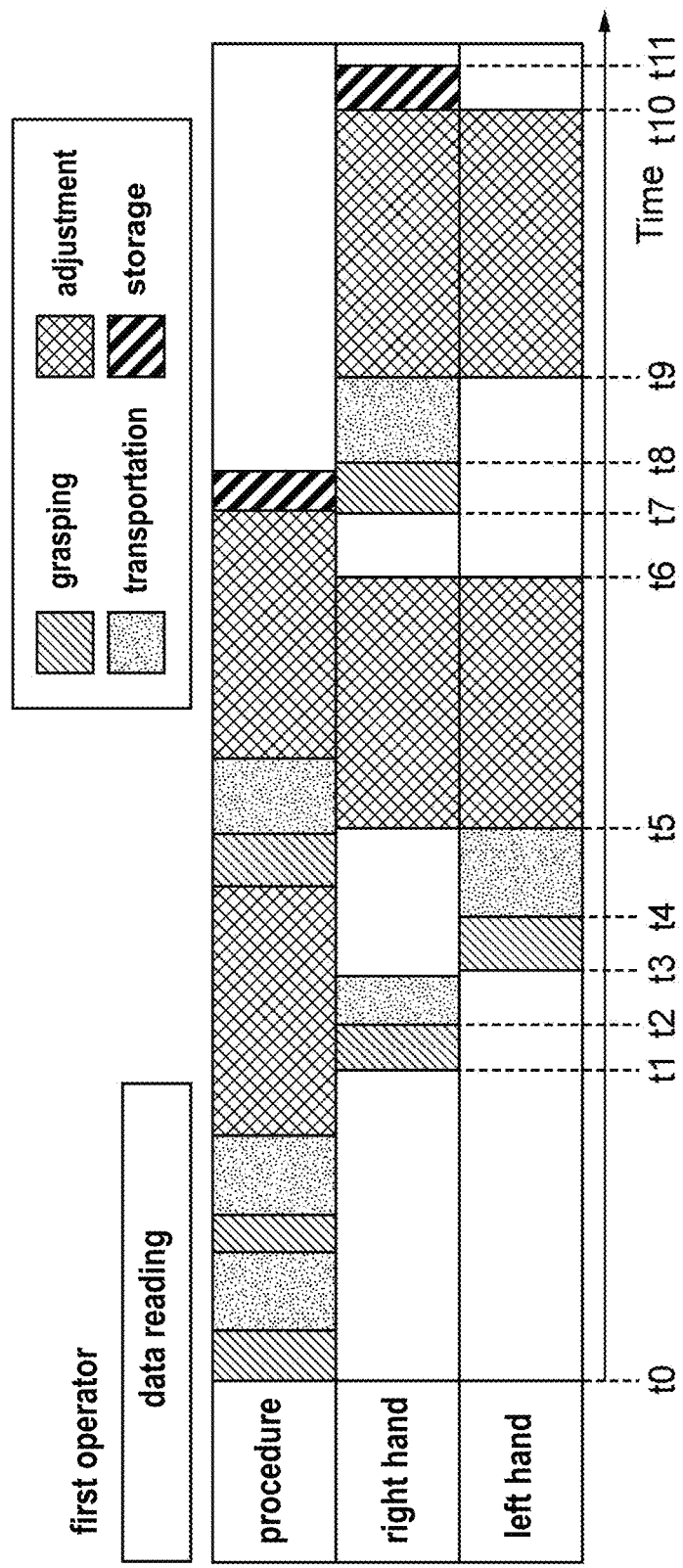
FIG. 5 is a diagram illustrating a display example of motion data of the related art.

FIG. 5 is a diagram illustrating a display example of motion data of the related art. This example is an example in which the motion data D1 of the left hand and the motion data D2 of the right hand shown in FIG. 4 are displayed in left alignment in a time-series order. In addition, in the drawing, reference motion data indicated as a "procedure" is displayed together.

In this example, a blank is displayed for a period in which the left hand and the right hand have stopped from time t0 to time t1, which results in applying compression to a display region. The motion data is actually meaningful after time t1, and it is displayed by a graph that a motion of grasping is performed with the right hand from time t1 to time t2, a motion of transportation is performed with the right hand from time t2 to time t3, a motion of grasping is performed with the left hand from time t3 to time t4, and a motion of transportation is performed with the left hand from time t4 to time t5.

In addition, it is indicated by a blank that neither the right hand nor the left hand performs a motion relating to an operation from time t6 to time t7. In other words, motion data from time t6 to time t7 is NA for both the right hand and the left hand.

Figure 6:
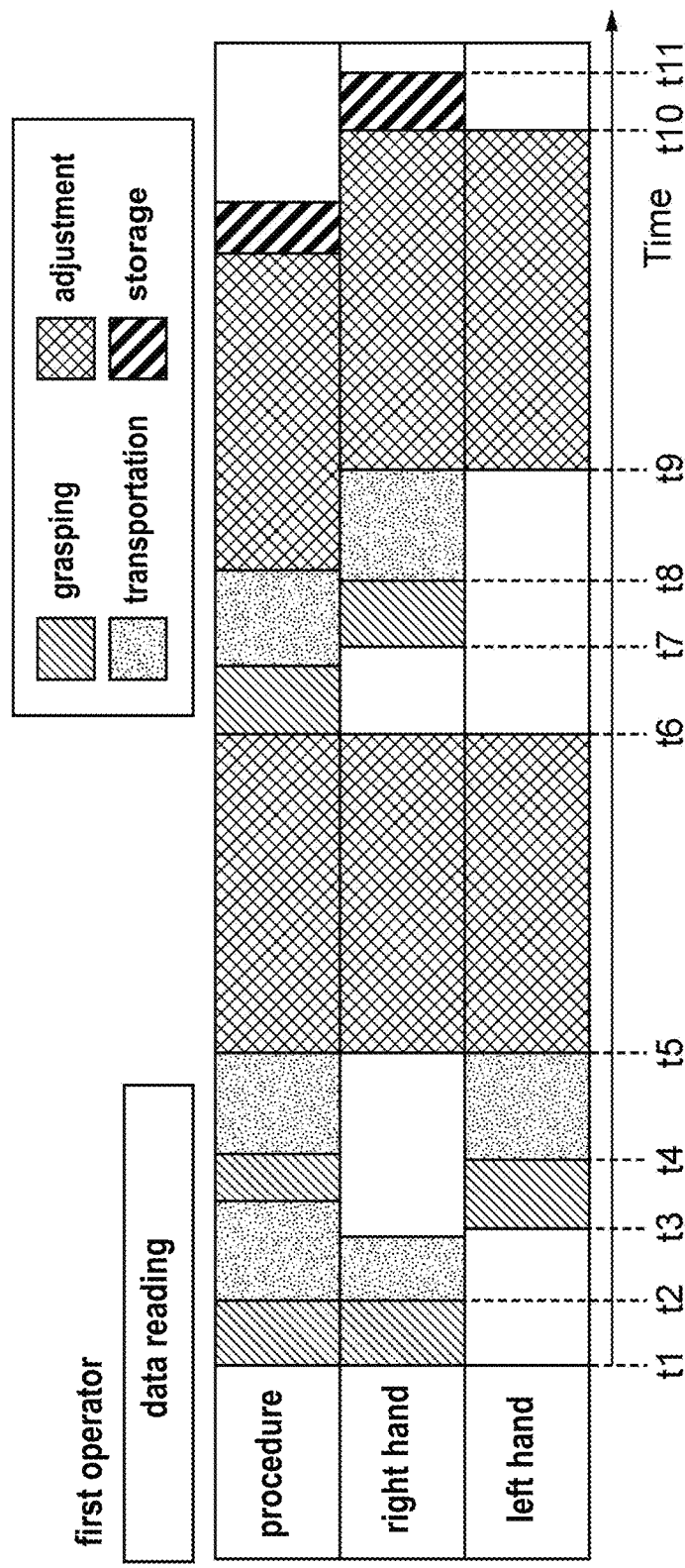
FIG. 6 is a diagram illustrating a display example of motion data controlled to be displayed by the motion analysis device according to the present embodiment.

FIG. 6 is a diagram illustrating a display example of motion data controlled to be displayed by the motion analysis device 10 according to the present embodiment. This example is an example in which the motion data D1 of the left hand and the motion data D2 of the right hand shown in FIG. 4 are displayed in left alignment in a time-series order. In addition, in the drawing, reference motion data indicated as a "procedure" is displayed together.

The motion analysis device 10 excludes data corresponding to a stop period of the operator A which is taken until an initial elemental motion is started from the motion data D1 of the left hand and the motion data D2 of the right hand, generates a plurality of shortened motion data, and causes the display part 10f to display the generated data. In this example, it is displayed by a graph that a period from time t0 to time t1 is excluded, a motion of grasping is performed with the right hand from time t1 to time t2, a motion of transportation is performed with the right hand from time t2 to time t3, a motion of grasping is performed with the left hand from time t3 to time t4, and a motion of transportation is performed with the left hand from time t4 to time t5.

In addition, it is indicated by a blank that neither the right hand nor the left hand performs a motion relating to an operation from time t6 to time t7. Such a period indicates that the operator A is not moving appropriately, and that there is room for improvement. For this reason, the motion analysis device 10 leaves such a period without excluding it.

Figure 7:
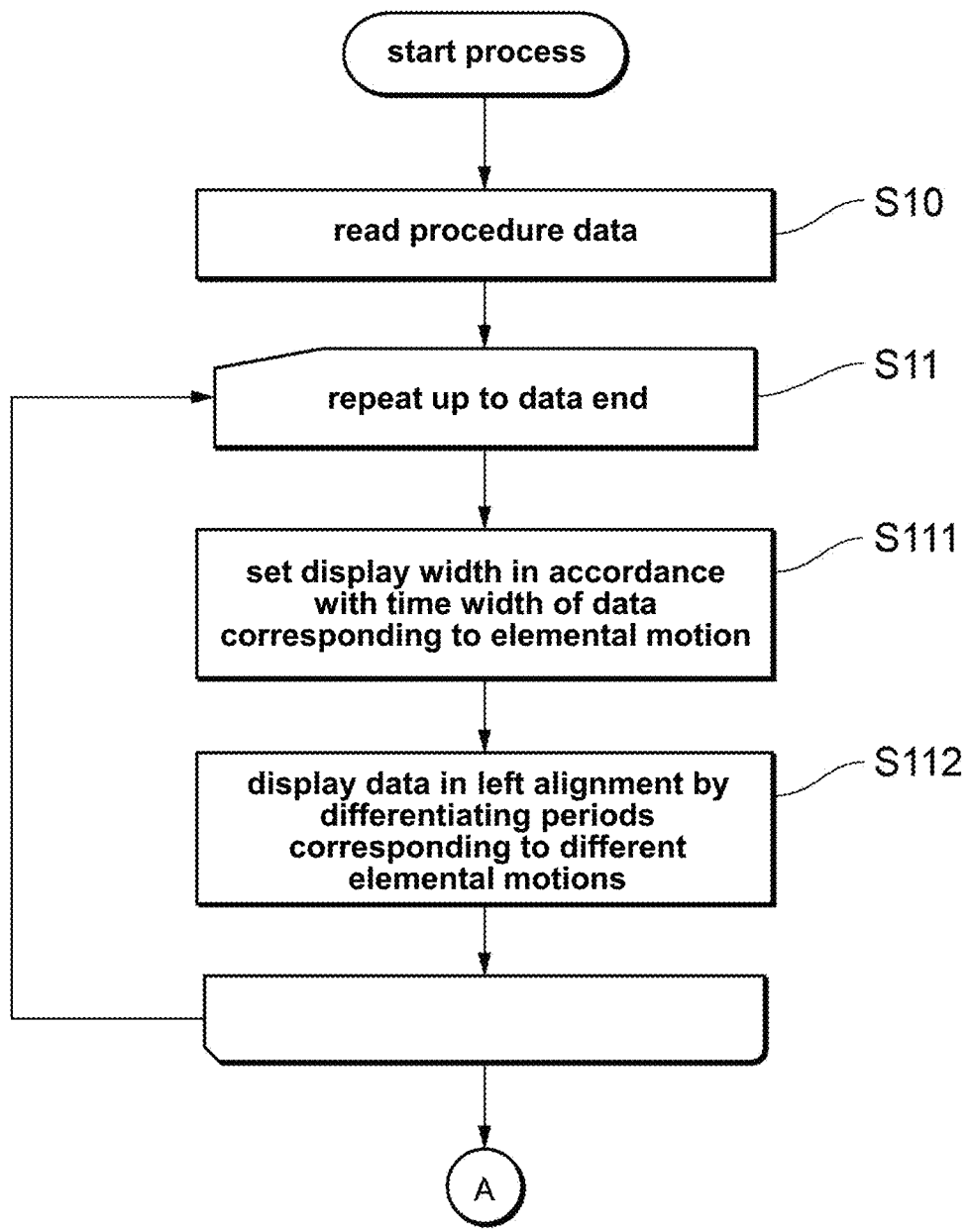
FIG. 7 is a flow chart of a first example of a display control process which is executed by the motion analysis device according to the present embodiment.

FIG. 7 is a flow chart of a first example of a display control process which is executed by the motion analysis device 10 according to the present embodiment. The first example of the display control process is an example of a process of performing control to display procedure data on the display part 10f. Meanwhile, the procedure data is reference motion data of the disclosure, and is motion data serving as a sample of an operation of the operator A.

First, the motion analysis device 10 reads procedure data from the storage part 13 (S10). The procedure data referred to here is motion data indicating an ideal procedure relating to an operation of the operator A. The procedure data may be read from the storage part 13, or may be read from an external storage device.

Next, the motion analysis device 10 repeatedly executes the following processes S111 and S112 up to the end of the procedure data (S11). The motion analysis device 10 sets a display width in accordance with the execution time of an elemental motion from the start to the end thereof (S111), and differentiates periods corresponding to different elemental motions and displays data in left alignment (S112).

By executing the first example of the display control process, the procedure data is displayed on the display part 10f in a time-series order with widths according to the execution time.

Figure 8:
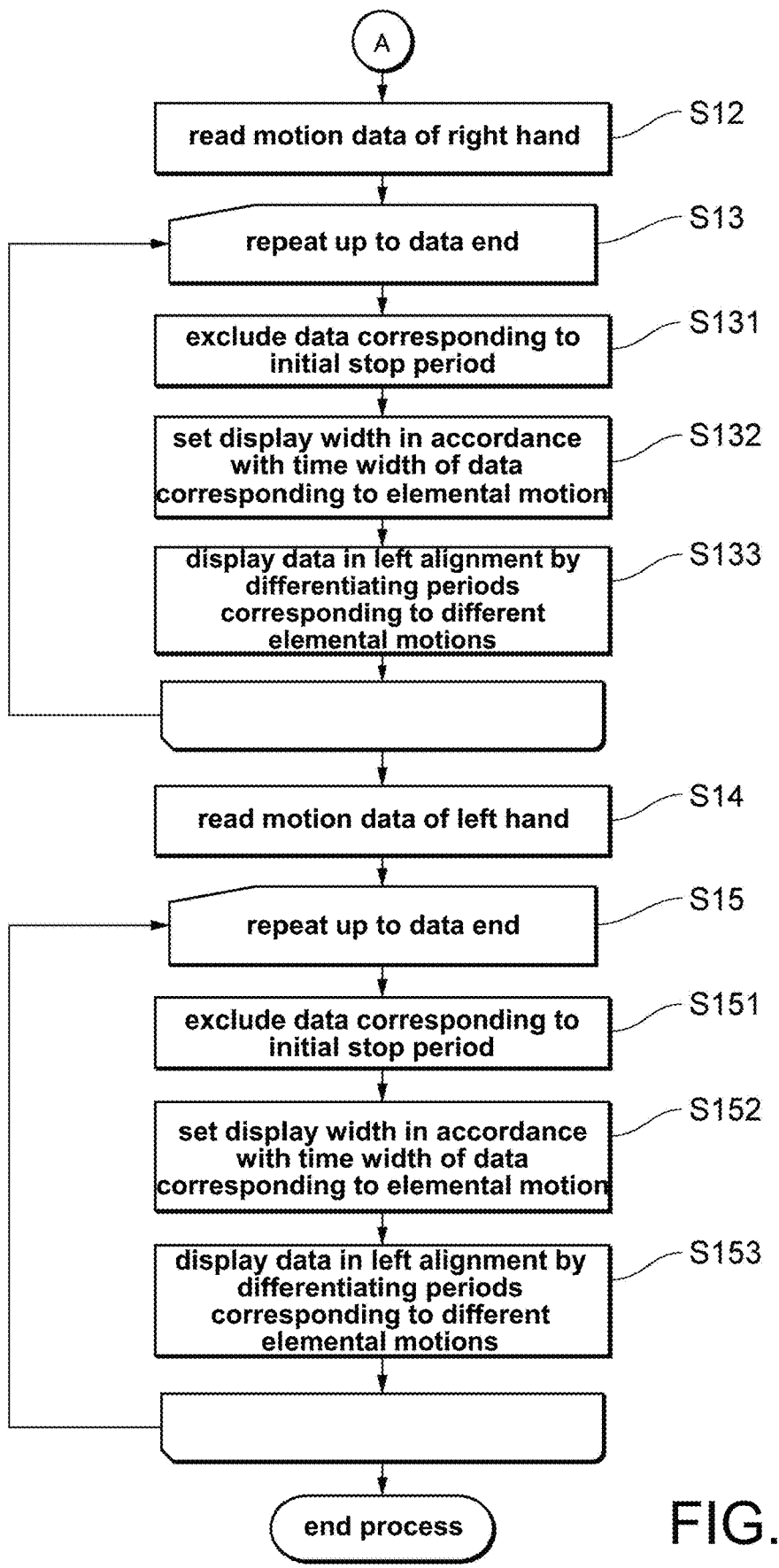
FIG. 8 is a flow chart of a second example of the display control process which is executed by the motion analysis device according to the present embodiment.

FIG. 8 is a flow chart of a second example of the display control process which is executed by the motion analysis device 10 according to the present embodiment. The second example of the display control process is an example of a process which is executed after the first example of the display control process and a process of performing control to display motion data of the right hand and the left hand.

The motion analysis device 10 reads motion data of the right hand (S12). Meanwhile, in this example, a case where a process relating to the motion data of the right hand is executed first will be described, but in the order of executing a process relating to the motion data of the right hand and a process relating to the motion data of the left hand, either can be executed first.

Next, the motion analysis device 10 repeatedly executes the following processes S131 to S133 up to the end of the motion data (S13). The motion analysis device 10 excludes data corresponding to an initial stop period (S131). The motion analysis device 10 sets a display width in accordance with the execution time of an elemental motion from the start to the end thereof (S132), and differentiates periods corresponding to different elemental motions and displays data in left alignment (S133).

Next, the motion analysis device 10 reads the motion data of the left hand (S14). The motion analysis device 10 repeatedly executes the following processes S151 to S153 up to the end of the motion data (S15). The motion analysis device 10 excludes data corresponding to an initial stop period (S151). The motion analysis device 10 sets a display width in accordance with the execution time of an elemental motion from the start to the end thereof (S152), and differentiates periods corresponding to different elemental motions and displays data in left alignment (S153).

Meanwhile, the motion analysis device 10 may exclude data corresponding to an overlapping period over an initial stop period included in the motion data of the right hand and an initial stop period included in the motion data of the left hand from the motion data of the right hand and the motion data of the left hand.

By executing the second example of the display control process, the motions of the right hand and the left hand are displayed on the display part 10f with data corresponding to the stop period excluded, and thus it is possible to use a display region efficiently.

Figure 9:
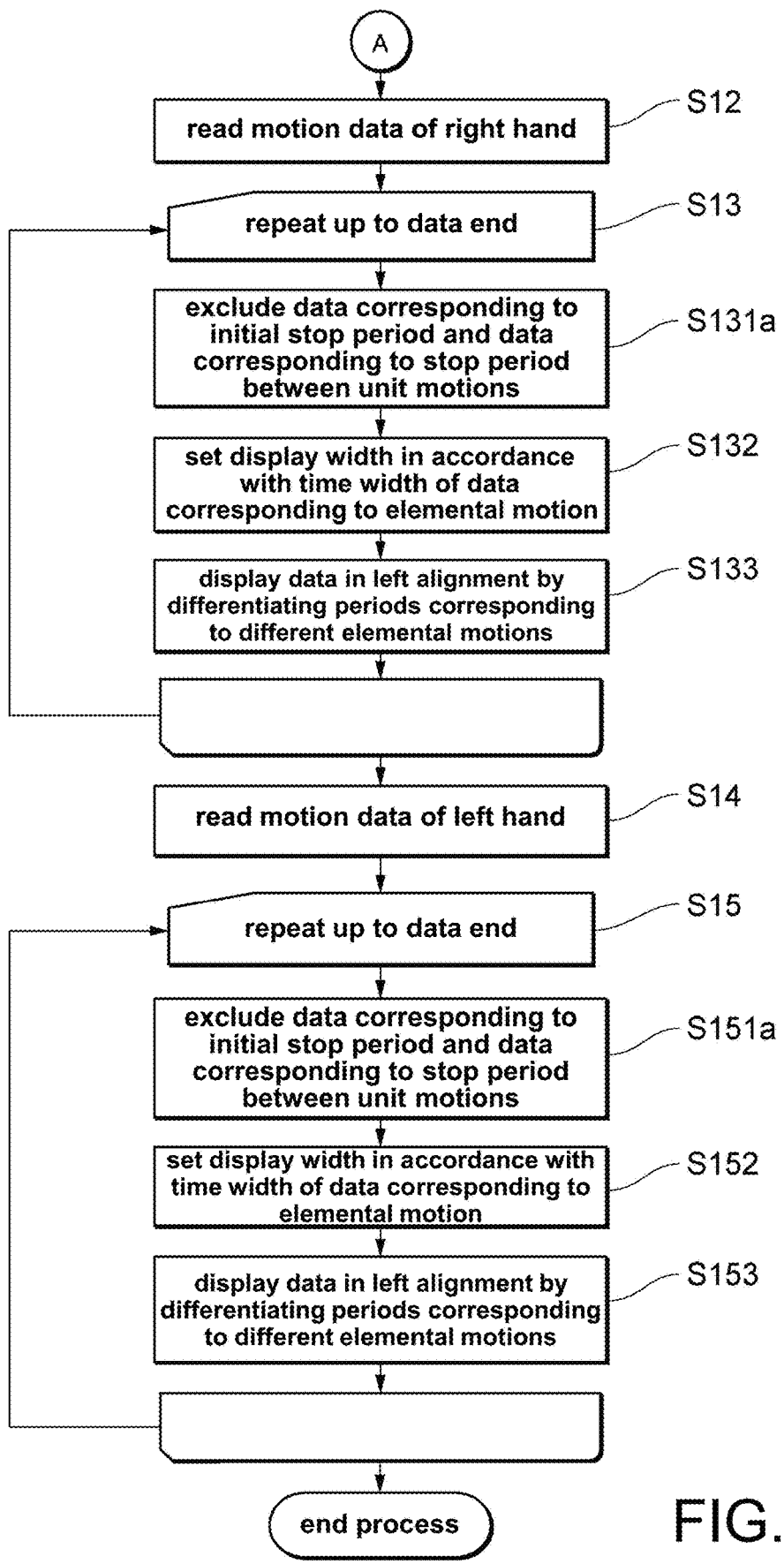
FIG. 9 is a flow chart of a third example of the display control process which is executed by the motion analysis device according to the present embodiment.

FIG. 9 is a flow chart of a third example of the display control process which is executed by the motion analysis device 10 according to the present embodiment. The third example of the display control process is an example of a process which is executed after the first example of the display control process and a process of performing control to display the motion data of the right hand and the left hand.

The motion analysis device 10 reads the motion data of the right hand (S12). Meanwhile, in this example, a case where a process relating to the motion data of the right hand is executed first will be described, but in the order of executing a process relating to the motion data of the right hand and a process relating to the motion data of the left hand, either can be executed first.

Next, the motion analysis device 10 repeatedly executes the following processes S131a to S133 up to the end of the motion data (S13). The motion analysis device 10 excludes data corresponding to an initial stop period and data corresponding to a stop period between unit motions (S131a). The motion analysis device 10 sets a display width in accordance with the execution time of an elemental motion from the start to the end thereof (S132), and differentiates periods corresponding to different elemental motions and displays data in left alignment (S133).

Next, the motion analysis device 10 reads the motion data of the left hand (S14). The motion analysis device 10 repeatedly executes the following processes S151a to S153 up to the end of the motion data (S15). The motion analysis device 10 excludes data corresponding to an initial stop period and data corresponding to a stop period between unit motions (S151a). The motion analysis device 10 sets a display width in accordance with the execution time of an elemental motion from the start to the end thereof (S152), and differentiates periods corresponding to different elemental motions and displays data in left alignment (S153).

Meanwhile, the motion analysis device 10 may exclude data corresponding to an overlapping period over an initial stop period included in the motion data of the right hand and an initial stop period included in the motion data of the left hand from the motion data of the right hand and the motion data of the left hand. In addition, the motion analysis device 10 may exclude data corresponding to an overlapping period over the motion data of the right hand and the motion data of the left hand in a stop period of the operator A which is taken until the unit motion is ended and then the next unit motion is started.

By executing the third example of the display control process, the motions of the right hand and the left hand are displayed on the display part 10f with the head of the motion data and data corresponding to a stop period between unit motions excluded, and thus it is possible to use a display region efficiently.

Embodiments of the disclosure may also be described as in the following additions. However, the embodiments of the disclosure are not limited to forms described in the following additions. In addition, the embodiments of the disclosure may be forms obtained by replacing or combining the descriptions between the additions.

[Addition 1]

A motion analysis device (10) comprising:

an acquisition part (11) that acquires time-series data relating to an operation performed by an operator;

an analysis part (12) that analyzes the time-series data and generates motion data indicating a type and execution time of an elemental motion;

a generation part (14) that excludes data corresponding to a stop period of the operator which is taken until an initial elemental motion is started from the motion data, and generates shortened motion data; and a display control part (15) that performs control to differentiate periods corresponding to different elemental motions and display the shortened motion data on a display part.

[Addition 2]

The motion analysis device (10) according to claim 1, wherein the display control part (15) performs control to differentiate periods corresponding to different elemental motions and display the shortened motion data and reference motion data indicating a plurality of elemental motions serving as a reference side by side on the display part.

[Addition 3]

The motion analysis device (10) according to claim 1 or 2, wherein the acquisition part (11) acquires multiple types of time-series data relating to the operation performed by the operator, the analysis part (12) analyzes each of the multiple types of time-series data and generates multiple types of motion data indicating a type and execution time of an elemental motion, the generation part (14) excludes data corresponding to a stop period of the operator which is taken until an initial elemental motion is started from the multiple types of motion data, and generates a plurality of shortened motion data, and the display control part (15) performs control to differentiate periods corresponding to different elemental motions and display the plurality of shortened motion data side by side on the display part.

[Addition 4]

The motion analysis device (10) according to any one of claims 1 to 3, wherein the generation part (14) excludes data corresponding to a stop period of the operator which is taken until a unit motion having the plurality of elemental motions constituted as one unit among the shortened motion data is ended and then a next unit motion is started, and generates additionally shortened motion data, and the display control part (15) performs control to differentiate periods corresponding to different elemental motions and display the additionally shortened motion data on the display part.

[Addition 5]

The motion analysis device (10) according to claim 4, wherein the acquisition part (11) acquires multiple types of time-series data relating to the operation performed by the operator, the analysis part (12) analyzes each of the multiple types of time-series data and generates multiple types of motion data indicating a type and execution time of an elemental motion, the generation part (14) excludes data corresponding to a stop period of the operator which is taken until an initial elemental motion is started from the multiple types of motion data, generates a plurality of shortened motion data, excludes data corresponding to an overlapping period over the plurality of shortened motion data in a stop period of the operator which is taken until a unit motion having the plurality of elemental motions constituted as one unit among the plurality of shortened motion data is ended and then a next unit motion is started, and generates a plurality of additionally shortened motion data, and the display control part (15) performs control to differentiate periods corresponding to different elemental motions and display the plurality of additionally shortened motion data side by side on the display part.

[Addition 6]

A motion analysis method comprising:

acquiring time-series data relating to an operation performed by an operator;

analyzing the time-series data and generating motion data indicating a type and execution time of an elemental motion;

excluding data corresponding to a stop period of the operator which is taken until an initial elemental motion is started from the motion data, and generating shortened motion data; and performing control to differentiate periods corresponding to different elemental motions and display the shortened motion data on a display part.

[Addition 7]

A motion analysis program causing a calculation part included in a motion analysis device (10) to function as:

an acquisition part (11) that acquires time-series data relating to an operation performed by an operator;

an analysis part (12) that analyzes the time-series data and generates motion data indicating a type and execution time of an elemental motion;

a generation part (14) that excludes data corresponding to a stop period of the operator which is taken until an initial elemental motion is started from the motion data, and generates shortened motion data; and a display control part (15) that performs control to differentiate periods corresponding to different elemental motions and display the shortened motion data on a display part.

Other Configurations

According to one embodiment of the present disclosure, a motion analysis device is provided and includes: an acquisition part that acquires time-series data relating to an operation performed by an operator; an analysis part that analyzes the time-series data and generates motion data indicating a type and execution time of an elemental motion; a generation part that excludes data corresponding to a stop period of the operator which is taken until an initial elemental motion is started from the motion data, and generates shortened motion data; and a display control part that performs control to differentiate periods corresponding to different elemental motions and display the shortened motion data on a display part.

According to this configuration, the shortened motion data excluding data corresponding to a stop period of the operator from the motion data is displayed on the display part, so that it is possible to use a display region more efficiently.

In one embodiment, the display control part may perform control to differentiate periods corresponding to different elemental motions and display the shortened motion data and reference motion data indicating a plurality of elemental motions serving as a reference side by side on the display part.

According to this configuration, displaying the reference motion data side by side with the motion data makes it possible for the operator to easily ascertain a motion to be executed.

In one embodiment, the acquisition part may acquire multiple types of time-series data relating to the operation performed by the operator, the analysis part may analyze each of the multiple types of time-series data and generate multiple types of motion data indicating a type and execution time of an elemental motion, the generation part may exclude data corresponding to a stop period of the operator which is taken until an initial elemental motion is started respectively from the multiple types of motion data, and generate a plurality of shortened motion data, and the display control part may perform control to differentiate periods corresponding to different elemental motions and display the plurality of shortened motion data side by side on the display part.

According to this configuration, the data corresponding to a stop period of the operator which is taken until an initial elemental motion is started is excluded from the multiple types of motion data, and the plurality of shortened motion data is displayed side by side, so that it is possible to use a display region more efficiently even in a case where there are many types of time-series data.

In one embodiment, the generation part may exclude data corresponding to a stop period of the operator which is taken until a unit motion having the plurality of elemental motions constituted as one unit among the shortened motion data is ended and then a next unit motion is started, and generate additionally shortened motion data, and the display control part may perform control to differentiate periods corresponding to different elemental motions and display the additionally shortened motion data on the display part.

According to this configuration, in a case where the unit motion is repeatedly executed, display of data corresponding to a stop period between the unit motions is omitted, and thus it is possible to use a display region more efficiently.

In one embodiment, the acquisition part may acquire multiple types of time-series data relating to the operation performed by the operator, the analysis part may analyze each of the multiple types of time-series data and generate multiple types of motion data indicating a type and execution time of an elemental motion, the generation part may exclude data corresponding to a stop period of the operator which is taken until an initial elemental motion is started respectively from the multiple types of motion data, generate a plurality of shortened motion data, exclude data corresponding to an overlapping period over the plurality of shortened motion data in a stop period of the operator which is taken until a unit motion having the plurality of elemental motions constituted as one unit among the plurality of shortened motion data is ended and then a next unit motion is started, and generate a plurality of additionally shortened motion data, and the display control part may perform control to differentiate periods corresponding to different elemental motions and display the plurality of additionally shortened motion data side by side on the display part.

According to this configuration, in a case where the unit motion is repeatedly executed, display of data corresponding to an overlapping period over a plurality of shortened motion data in a stop period between the unit motions is omitted, and thus it is possible to use a display region more efficiently.

According to another embodiment of the present disclosure, a motion analysis method is provided and includes: acquiring time-series data relating to an operation performed by an operator; analyzing the time-series data and generating motion data indicating a type and execution time of an elemental motion; excluding data corresponding to a stop period of the operator which is taken until an initial elemental motion is started from the motion data, and generating shortened motion data; and performing control to differentiate periods corresponding to different elemental motions and display the shortened motion data on a display part.

According to this configuration, the shortened motion data excluding data corresponding to a stop period of the operator from the motion data is displayed on the display part, so that it is possible to use a display region more efficiently.

According to another embodiment of the present disclosure, a non-transitory computer-readable recording medium that stores a motion analysis program causing a calculation part included in a motion analysis device to function as: an acquisition part that acquires time-series data relating to an operation performed by an operator; an analysis part that analyzes the time-series data and generates motion data indicating a type and execution time of an elemental motion; a generation part that excludes data corresponding to a stop period of the operator which is taken until an initial elemental motion is started from the motion data, and generates shortened motion data; and a display control part that performs control to differentiate periods corresponding to different elemental motions and display the shortened motion data on a display part.

According to this configuration, the shortened motion data excluding data corresponding to a stop period of the operator from the motion data is displayed on the display part, so that it is possible to use a display region more efficiently.

According to the disclosure, it is possible to provide a motion analysis device, a motion analysis method and a motion analysis program that make it possible to use a display region more efficiently.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A motion analysis device comprising:
a processor, configured to
acquire time-series data relating to an operation performed by an operator and analyze the time-series data and generates motion data indicating a type and execution time of an elemental motion;
exclude data corresponding to a stop period of the operator which is taken until an initial elemental motion is started from the motion data, and generates shortened motion data; and
perform control to differentiate periods corresponding to different elemental motions and display the shortened motion data on a display part.

2. The motion analysis device according to claim 1, wherein the processor performs control to differentiate periods corresponding to different elemental motions and display the shortened motion data and reference motion data indicating a plurality of elemental motions serving as a reference side by side on the display part.

3. The motion analysis device according to claim 2, wherein the processor acquires multiple types of time-series data relating to the operation performed by the operator, and analyzes each of the multiple types of time-series data and generates multiple types of motion data indicating a type and execution time of an elemental motion,
the processor excludes data corresponding to a stop period of the operator which is taken until an initial elemental motion is started respectively from the multiple types of motion data, and generates a plurality of shortened motion data, and
the processor preforms control to differentiate periods corresponding to different elemental motions and display the plurality of shortened motion data side by side on the display part.

4. The motion analysis device according to claim 2, wherein the processor excludes data corresponding to a stop period of the operator which is taken until a unit motion having the plurality of elemental motions constituted as one unit among the shortened motion data is ended and then a next unit motion is started, and generates additionally shortened motion data, and
the processor performs control to differentiate periods corresponding to different elemental motions and display the additionally shortened motion data on the display part.

5. The motion analysis device according to claim 4, wherein the processor acquires multiple types of time-series data relating to the operation performed by the operator, and analyzes each of the multiple types of time-series data and generates multiple types of motion data indicating a type and execution time of an elemental motion,
the processor excludes data corresponding to a stop period of the operator which is taken until an initial elemental motion is started respectively from the multiple types of motion data, generates a plurality of shortened motion data, excludes data corresponding to an overlapping period over the plurality of shortened motion data in a stop period of the operator which is taken until a unit motion having the plurality of elemental motions constituted as one unit among the plurality of shortened motion data is ended and then a next unit motion is started, and generates a plurality of additionally shortened motion data, and
the processor performs control to differentiate periods corresponding to different elemental motions and display the plurality of additionally shortened motion data side by side on the display part.

6. The motion analysis device according to claim 1, wherein the processor acquires multiple types of time-series data relating to the operation performed by the operator, and analyzes each of the multiple types of time-series data and generates multiple types of motion data indicating a type and execution time of an elemental motion,
the processor excludes data corresponding to a stop period of the operator which is taken until an initial elemental motion is started respectively from the multiple types of motion data, and generates a plurality of shortened motion data, and
the processor performs control to differentiate periods corresponding to different elemental motions and display the plurality of shortened motion data side by side on the display part.

7. The motion analysis device according to claim 6, wherein the processor excludes data corresponding to a stop period of the operator which is taken until a unit motion having the plurality of elemental motions constituted as one unit among the shortened motion data is ended and then a next unit motion is started, and generates additionally shortened motion data, and
the processor performs control to differentiate periods corresponding to different elemental motions and display the additionally shortened motion data on the display part.

8. The motion analysis device according to claim 7, wherein the processor acquires multiple types of time-series data relating to the operation performed by the operator, and analyzes each of the multiple types of time-series data and generates multiple types of motion data indicating a type and execution time of an elemental motion, the processor excludes data corresponding to a stop period of the operator which is taken until an initial elemental motion is started respectively from the multiple types of motion data, generates a plurality of shortened motion data, excludes data corresponding to an overlapping period over the plurality of shortened motion data in a stop period of the operator which is taken until a unit motion having the plurality of elemental motions constituted as one unit among the plurality of shortened motion data is ended and then a next unit motion is started, and generates a plurality of additionally shortened motion data, and the processor performs control to differentiate periods corresponding to different elemental motions and display the plurality of additionally shortened motion data side by side on the display part.

9. The motion analysis device according to claim 1, wherein the processor excludes data corresponding to a stop period of the operator which is taken until a unit motion having the plurality of elemental motions constituted as one unit among the shortened motion data is ended and then a next unit motion is started, and generates additionally shortened motion data, and the processor performs control to differentiate periods corresponding to different elemental motions and display the additionally shortened motion data on the display part.

10. The motion analysis device according to claim 9, wherein the processor acquires multiple types of time-series data relating to the operation performed by the operator, and analyzes each of the multiple types of time-series data and generates multiple types of motion data indicating a type and execution time of an elemental motion, the processor excludes data corresponding to a stop period of the operator which is taken until an initial elemental motion is started respectively from the multiple types of motion data, generates a plurality of shortened motion data, excludes data corresponding to an overlapping period over the plurality of shortened motion data in a stop period of the operator which is taken until a unit motion having the plurality of elemental motions constituted as one unit among the plurality of shortened motion data is ended and then a next unit motion is started, and generates a plurality of additionally shortened motion data, and the processor performs control to differentiate periods corresponding to different elemental motions and display the plurality of additionally shortened motion data side by side on the display part.

11. A motion analysis method comprising:

acquiring time-series data relating to an operation performed by an operator;

analyzing the time-series data and generating motion data indicating a type and execution time of an elemental motion;

excluding data corresponding to a stop period of the operator which is taken until an initial elemental motion is started from the motion data, and generating shortened motion data; and performing control to differentiate periods corresponding to different elemental motions and display the shortened motion data on a display part.

12. A non-transitory computer-readable recording medium that stores a motion analysis program causing a calculation part included in a motion analysis device to function as:

an acquisition part that acquires time-series data relating to an operation performed by an operator;

an analysis part that analyzes the time-series data and generates motion data indicating a type and execution time of an elemental motion;

a generation part that excludes data corresponding to a stop period of the operator which is taken until an initial elemental motion is started from the motion data, and generates shortened motion data; and a display control part that performs control to differentiate periods corresponding to different elemental motions and display the shortened motion data on a display part.

* * * * *